March 22, 1932.  D. R. L. FOLLET  1,850,871
AUTOMATIC MEASURING DEVICE FOR GASEOUS MIXTURE ANALYSIS
Filed Nov. 8, 1927  2 Sheets-Sheet 2

INVENTOR:
Didier R. L. Follet
BY
ATTORNEY

Patented Mar. 22, 1932

1,850,871

UNITED STATES PATENT OFFICE

DIDIER RENÉ LÉOPOLD FOLLET, OF PARIS, FRANCE, ASSIGNOR TO SOCIETE L'AIR LIQUIDE SOCIETE ANONYME POUR L'ETUDE & L'EXPLOITATION DES PROCEDES GEORGES CLAUDE, OF PARIS, FRANCE

AUTOMATIC MEASURING DEVICE FOR GASEOUS MIXTURE ANALYSIS

Application filed November 8, 1927, Serial No. 231,928, and in France May 11, 1927.

This invention relates to an automatic measuring device designed for the analysis of any gaseous mixture through absorption, combustion or any other reaction of one or several of the gaseous mixture components, by measuring the residual volume subsisting after the reaction.

In the hitherto known automatic devices for gas analysis by measuring a residual gaseous volume, the operation is conducted in one of two ways; either the residual gas is collected in a movable enclosure (for example a bell) connected with a registering device through rigid members, so that the unavoidable inertia of the registering device is a cause of error in the estimation of the theoretical equilibrium position of the enclosure and, consequently, in the measuring of the residual volume; or else a measurement is made, as for instance by means of a float, of the level displacements of a liquid contained in a tube that communicates with the residual gas, under such conditions that to a variation in the residual gaseous volume there will correspond a substantially equal variation of the volume occupied within the tube by the liquid, in which case the tube must be given a section sufficient to permit the float, or any other such like register-operating contrivance, to be introduced thereinto, which limits the amplitude of the liquid level displacements, that is to say the accuracy of the measuring.

This invention has for one of its objects to automatically register, by means of a special hydrostatic transmission, the measure of the residual gaseous volume in such conditions that the volume variations of the liquid in the hydrostatic equilibrium tube containing the float of the registering device can be made as great as required in respect of the corresponding volume variations of the residual gas in the measuring burette, so that accuracy is thereby materially increased. Said feature renders my apparatus or device especially serviceable for the purposes of analyzing gaseous mixtures in which the residual volume is very small, or, on the contrary, very close to the initial volume, as is the case, for instance, with comparatively pure gases the purity condition of which is desired to be ascertained.

A further advantage of the invention is to afford a thorough elimination of the constituents to be removed from the gaseous mixture by causing the gaseous mixture to be scrubbed by a liquid during its treatment.

Other advantages of the invention will also appear further on from the following description.

My apparatus or device takes avail of the well known fact that any passage of liquid through a gas or, inversely, of a gas through a liquid, is impossible within a capillary tube.

In order to make the invention quite clearly understood, I will now fully describe it by reference to the accompanying drawings, in which.

Figure 1:
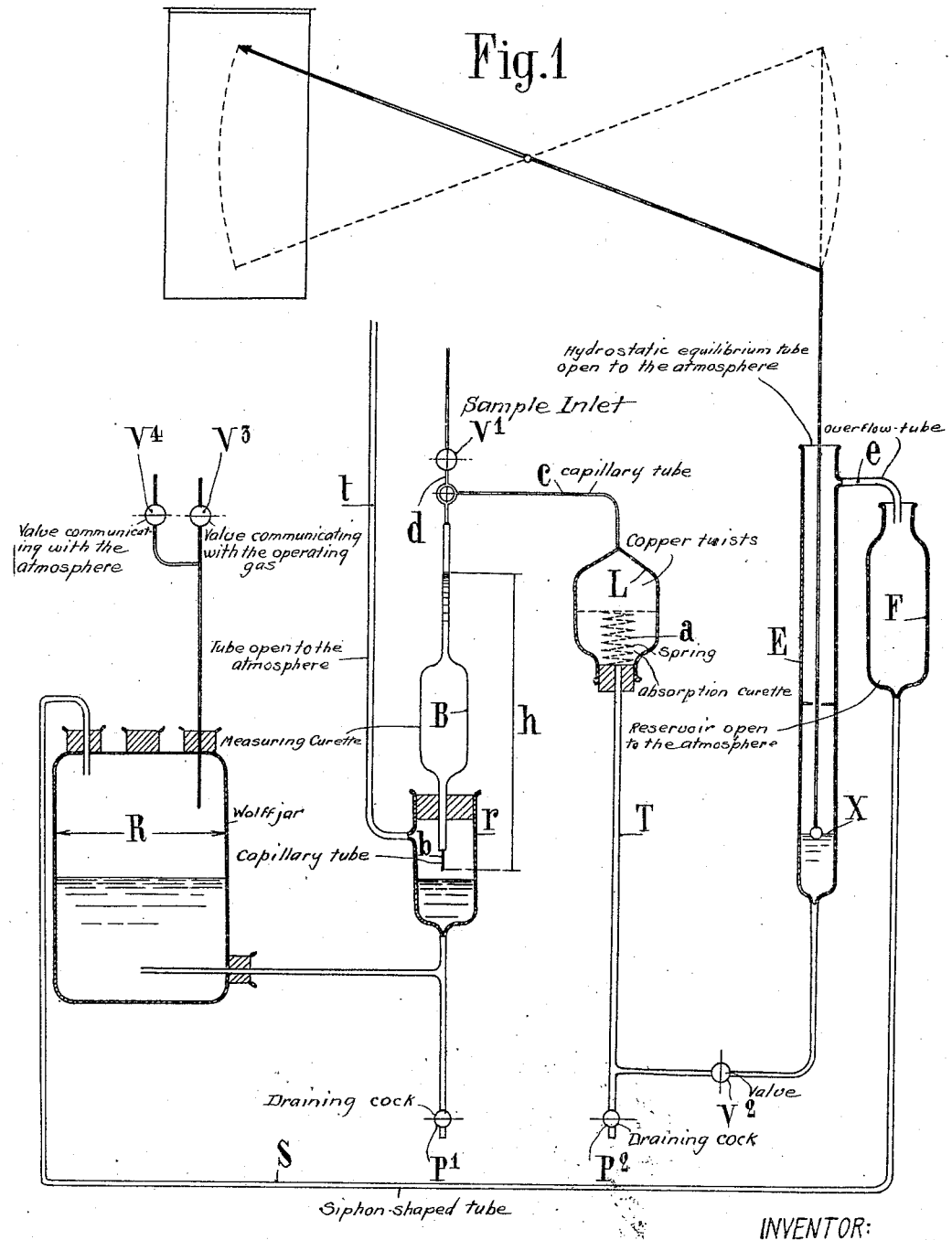
Figure 1 illustrates, as an example, an embodiment of a device intended for measuring through absorption the grade of purity of commercial oxygen.

Referring to Figure 1:

R denotes a three-nozzle Wolff jar.

$r$ is a container provided with a side tube $t$ communicating with the atmosphere.

B is a measuring burette whereinto the gas to be analyzed will be led and wherein the residual gas will be trapped. Burette B has its lower part terminating in an open capillary tube $b$ dipping into container $r$ and has its upper part terminating in a second capillary tube $d$. A capillary tube $c$ connects tube $d$ with an absorption burette L, into the upper part of which electrolytic copper twists are pressed by means of a spring $a$. The lower part of burette L communicates through tube T with an open tube E in communication with the atmosphere and provided at its upper part with an overflow tube $e$ which discharges into a reservoir F also exposed to atmospheric air.

S is a U-shaped tube connecting the lower part of reservoir F with vessel R and the vertical branches of which are of a length greater than the liquid height in the apparatus that measures the pressure of the operating gas, of which more hereinafter.

$V^1$, $V^2$, $V^3$ and $V^4$ are valves mechanically controlled from one and the same cam shaft (not shown) which is rotated by a small electric motor through a speed reducing gear.

$P^1$ and $P^2$ are draining cocks.

The liquid or liquor with which the apparatus is provided in the example under consideration is an ammonia solution the composition of which is well known and which has the property of absorbing oxygen in the presence of copper.

Previous to any measuring operation, I fill the siphon-shaped tube 8 with liquid of which the height in the vertical branches is greater than the liquid-height that measures the pressure of the operating gas. I begin by charging the apparatus with liquid, for which purpose I proceed as follows:

Through its central nozzle I fill jar R with a suitable amount of ammonia solution and I shut valve $V^4$, leaving open valves $V^1$, $V^2$ and $V^3$. Under the pressure (about 0.50 meters of water) of an operating gas, for instance nitrogen, coming in through valve $V^3$ and having no action on the liquid in the apparatus, the liquid is caused to rise in container $r$, tube $t$ and burette B; the air contained in burette B is driven out through valve $V^1$ while the liquid continues rising. When said liquid has reached the level of capillary tube $c$, I shut valve $V^1$ and the liquid flows on through tube $c$, burette L, tubes T, E, $e$, reservoir F and tube S. Once equilibrium is established, I open valve $V^4$ and I shut valve $V^3$, while $V^1$ remains shut and valve $V^2$ open; the liquid in the apparatus then flows in the direction opposite the above indicated one, driving through tube $c$ part of the air contained in burette L, said part of air being thereby transferred into burette B. The liquid ceases to flow when hydrostatic equilibrium is established in the set E, T, L, $c$, $d$ and B. I then repeat the first of the above described operations, that is to say I open valve $V^3$ again and I shut valve $V^4$ again, taking care to open also valve $V^1$ again. The portion of the air within burette L that was transferred into burette B is thereby driven out through valve $V^1$. As will be readily realized, when this double to-and-fro flow of the liquid throughout the apparatus has been effected two or three times, the whole amount of air contained in burette L will have been driven out, while burette B is the only one that still contains some air, and the whole set consisting of tube $c$, burette L, tube T and tube E is filled with liquid. I then draw some liquid through draining cock $P^1$, or, on the contrary, I may add some in jar R in order that the liquid level in container $r$ may be about one centimeter below the lower end of tube $b$.

Instead of proceeding as has just been described, I may furnish the apparatus with liquid in a single operation by admitting liquid under sufficiently high pressure, for example by means of a container lying above the apparatus, through draining cock $P^2$.

The apparatus is thus furnished once for all and ready for operation.

I then put valve $V^1$ into final communication with the container holding the gas to be analyzed and proceed with the measuring operations proper as follows:

1. Admission of the gas to be analyzed. For this purpose I shut valve $V^2$ and leave valves $V^1$ and $V^4$ open, and valve $V^3$ shut. The gas to be analyzed circulates freely through burette B and escapes through side pipe $t$.

2. Sample measuring. I shut valves $V^1$ and $V^4$ and open valve $V^3$. The operating gas causes the liquid to rise within container $r$ and traps the gas to be analyzed in burette B.

3. Oxygen absorption. I open valve $V^2$; the liquid flows on through burette B and tubes $d$ and $c$, driving before it the gas to be analyzed which comes to be absorbed in burette L in the presence of the copper; the liquid continues flowing on through tube T, valve $V^2$, tube E and tube $e$ and accumulates in reservoir F.

Figure 2:
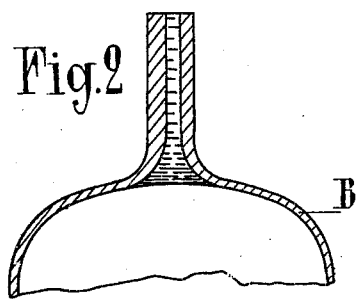
Figure 2 shows on an enlarged scale a detail of Figure 1.

4. Residual gas measuring. I shut valve $V^3$ and open valve $V^4$; the operating gas no longer acts; pressure becomes equal in jar R and in tube E, and the liquid begins to move in the direction opposite the above described one; it flows from tube E towards tube T through valve $V^2$, driving before it through burette L the nonabsorbed gas which flows through tubes $c$ and $d$ and is collected in burette B. The liquid continues flowing until hydrostatic equilibrium is established within said burette B, the upper level of the liquid taking place in all cases at the same point, as indicated in Figure 2, and a certain amount of liquid remaining suspended in the lower part of burette B owing to the presence of capillary tube $b$. With the capillary tube illustrated in the drawings referred to, the pressure under which the residual gas is collected is, of course, below atmospheric pressure. But the capillary tube might as well be bent upwards and terminate higher than the bottom of the measuring burette, for example as high as or even higher than the top of the burette, provided its open end be directed downwards so as to permit a convenient dipping into the container $r$. The pressure under which the residual gas is collected might in the latter cases be higher than atmospheric pressure.

In all cases, it would be possible to read directly from a suitable graduation which would be carried by burette B the volume that would be occupied by the residual gas, the latter being brought back to atmospheric pressure, but, in practice, said residual volume will be automatically registered as follows:

Let $h$ be the height above the lower end of capillary tube $b$ at which the lower level $r$ of the liquid within burette B lies, hence, $h$ corresponds to the depression, measured as height of the liquid in the apparatus, under which the residual gas is collected. To this height $h$ corresponds a single, perfectly determined, level X of the liquid in tube E, and it is this level that I indicate on a rotary registering cylinder by means of a tracer the movement of which is controlled by the motions of a crystal float resting on the surface of the liquid within tube E.

In order to obtain accurate measuring, it is obviously important to provide that a small variation of the residual gas volume will correspond to as large as possible a variation of height $h$ and, consequently, of the motion of the float that controls the registering device. In order to achieve this result, I have only to make the measuring burette of as small as possible a section, without providing for any capillary action, however, at the place where the liquid stops; and such is the case with the burette shown by Figure 1, where, as already stated, the residual volume is very small.

Figure 3:
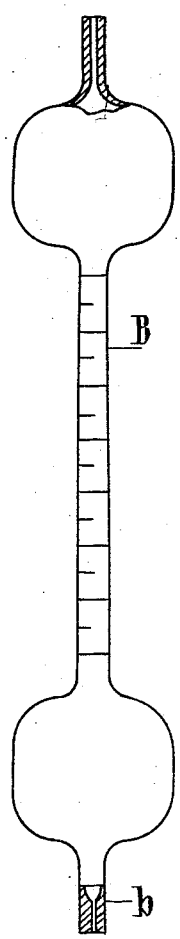
Figures 3 and 4 represent modifications of the measuring burette which is part of the Figure 1 device.

In the case where the proportion of gas to be absorbed is known as being, for instance, about 50% of the initial gas, I merely have to constitute the measuring burette after the manner shown, as an example, by Figure 3, so that again the liquid level will lie in the thin part of the burette.

Figure 4:
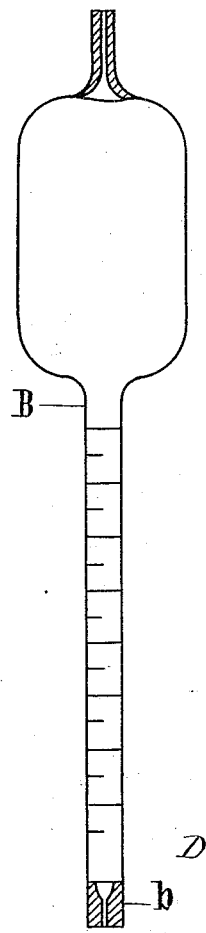

Similarly, Figure 4 corresponds to the case where only a very small part of the gas is absorbed.

Of course, my invention applies as well to the case of a liquid that is itself an absorbent without having to be put in the presence of a solid, and also to the case of absorption by a solid alone. In the latter case, the solid is put in the absorption burette L, and the liquid with which the apparatus is furnished is then merely an operating liquid that has also the effect of ensuring an intimate contact between the absorbent and the gas to be analyzed.

My invention is equally applicable in the case of analysis through combustion. The gas caused to be circulated through the measuring burette is then obtained by previously mixing, in known proportions, the gas to be analyzed and a fuel gas which will generally be oxygen. Combustion is effected inside the burette or reaction chamber L, suitably arranged for the purpose, and the composition of the initial gas is determined from the measurement, carried out as hereinabove explained, of the volume of the residual gas imprisoned in burette B.

I claim as my invention:—

1. The method of analyzing a gaseous mixture, which comprises removing one or more constituents of a given quantity of the gaseous mixture by a suitable treatment, enclosing the residual gas remaining after said treatment within a container which terminates at its lower end in an open capillary tube communicating with atmospheric air and at its upper end in another capillary tube, the extension of which is a hydrostatic equilibrium tube communicating with atmospheric air, allowing hydrostatic equilibrium to take place within said container, capillary tubes and hydrostatic equilibrium tube, the residual gas being thereby enclosed between two bodies of liquid, one of which fills the lower part of the container and the adjacent capillary tube, while the other fills the capillary tube adjacent to the upper end of the container and part of the hydrostatic equilibrium tube, and measuring the height of the liquid enclosed within the lower part of the container.

2. The method of analyzing a gaseous mixture, which comprises removing one or more constituents of a given quantity of the gaseous mixture by a suitable treatment, enclosing the residual gas remaining after said treatment within a container which terminates at its lower end in an open capillary tube communicating with atmospheric air and at its upper end in another capillary tube, the extension of which is a hydrostatic equilibrium tube communicating with atmospheric air, allowing hydrostatic equilibrium to take place within said container, capilliary tubes and hydrostatic equilibrium tube, the residual gas being thereby enclosed between two bodies of liquid, one of which fills the lower part of the container and the adjacent capillary tube, while the other fills the capillary tube adjacent to the upper end of the container and part of the hydrostatic equilibrium tube, and measuring the height of the liquid enclosed within the ascending branch of the hydrostatic equilibrium tube.

3. The method of analyzing a gaseous mixture, which comprises circulating the gaseous mixture under a determined pressure through a container which terminates at its lower end in an open capillary tube, trapping a determined volume of the gaseous mixture within the container, forwarding said volume through another capillary tube to a treatment chamber, removing one or more constituents of said volume by a suitable treatment taking place inside said chamber, causing the remaining gas to flow backwards into the container, allowing hydrostatic equilibrium to take place within said container, capillary tubes, treatment chamber and hydrostatic equilibrium tube, the residual gas being thereby enclosed between two bodies of liquid, one of which fills the lower part of the container and the adjacent capillary tube, while the other fills the capillary tube adjacent to the upper end of the container, the treatment chamber and part of the hydrostatic equilibrium tube, and measuring the height of the liquid enclosed within the lower part of the container.

4. The method of analyzing a gaseous mixture, which comprises circulating the gaseous mixture under a determined pressure through a container which terminates at its lower end by an open capillary tube, trapping a determined volume of the gaseous mixture within the container, forwarding said volume through another capillary tube to a treatment chamber, removing one or more constituents of said volume by a suitable treatment taking place inside said chamber, causing the remaining gas to flow backwards into the container, allowing hydrostatic equilibrium to take place within said container, capillary tubes, treatment chamber and hydrostatic equilibrium tube, the residual gas being thereby enclosed between two bodies of liquid, one of which fills the lower part of the container and the adjacent capillary tube, while the other fills the capillary tube adjacent to the upper end of the container, the treatment chamber and part of the hydrostatic equilibrium tube, and measuring the height of the liquid enclosed within the ascending branch of the hydrostatic equilibrium tube.

5. An apparatus for analyzing a gaseous mixture by removal of one or more constituents of a given quantity of the gaseous mixture and measurement of the quantity of the residual gas remaining after said treatment, comprising a container for trapping said given quantity of the gaseous mixture, which container terminates at its lower end in an open capillary tube communicating with atmospheric air, a chamber for treating the given quantity of the gaseous mixture, a capillary tube connecting the top of said container with the top of said treatment chamber, a hydrostatic equilibrium tube forming an extension of the treatment chamber and means for circulating the gaseous mixture through the container, trapping a given quantity of said mixture within the container, forwarding it into the treatment chamber, and expelling the gas remaining after treatment into the container.

6. The method of analyzing a gaseous mixture, which comprises collecting a sample of the gaseous mixture in a container between two bodies of liquid, one contacting with the gaseous mixture at the lowest part of the space occupied by the same, and the other at the highest part of said space; forcing said gaseous mixture at least once into a treatment chamber by means of the first-named liquid which flows downwardly through the gas in said treatment chamber; removing one or more constituents of the gaseous mixture; allowing the residual gaseous mixture to be transferred from the treatment chamber to said container; and determining the quantity of said residual gaseous mixture.

7. The method of analyzing a gaseous mixture, which comprises collecting a sample of the gaseous mixture in a container between two bodies of liquid, one liquid contacting with the gaseous mixture at the lowest part of the space occupied by the same, and the other at the highest part of the said space; forcing said gaseous mixture at least once into a treatment chamber by means of the first-named liquid which flows downwardly through the gas in the treatment chamber; removing one or more constituents of the gaseous mixture; allowing the residual gaseous mixture to be transferred from the treatment chamber to said container; allowing a hydrostatic equilibrium to take place within the residual gaseous mixture and the two bodies of liquid; and indicating the height of the volume of the residual gaseous mixture in the said container by the height of the second-mentioned liquid in a tube open to the atmosphere, which height differs from the height of the volume of the residual gas only by a constant quantity.

8. The method of analyzing a gaseous mixture in a container which comprises collecting a sample of the gaseous mixture between two bodies of liquid, one liquid contacting with the gaseous mixture at the lower part of the space occupied by the same and the other at the highest part of the said space; forcing said gaseous mixture at least once into a treatment chamber by means of the first-named liquid which flows downwardly through the gas in the treatment chamber; removing one or more constituents of the gaseous mixture; allowing the residual gaseous mixture to be transferred from the treatment chamber to the first-mentioned container; allowing a hydrostatic equilibrium to take place within the residual gaseous mixture and two bodies of liquid; indicating the height of the volume of the residual gaseous mixture in the said container by the height of the second-mentioned liquid in a tube open to the atmosphere, which height differs from the height of the residual gas only by a constant quantity; and registering the height of the liquid in the said tube by means of a float following the said height.

In testimony whereof I affix my signature.

DIDIER RENÉ LÉOPOLD FOLLET.